(12) United States Patent
Shafiee

(10) Patent No.: US 8,924,996 B2
(45) Date of Patent: Dec. 30, 2014

(54) SESSION MANAGER

(75) Inventor: Mohammad Reza Shafiee, Ridgefield, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 135 days.

(21) Appl. No.: 13/291,155

(22) Filed: Nov. 8, 2011

(65) Prior Publication Data

US 2013/0117120 A1 May 9, 2013

(51) Int. Cl.
*H04N 7/16* (2011.01)
*H04N 7/173* (2011.01)
*G06Q 30/02* (2012.01)
*H04N 21/81* (2011.01)
*G06F 17/30* (2006.01)

(52) U.S. Cl.
CPC ............... *H04N 7/173* (2013.01); *H04N 7/16* (2013.01); *G06Q 30/0261* (2013.01); *G06Q 30/0269* (2013.01); *G06Q 30/0267* (2013.01); *H04N 21/812* (2013.01); *G06F 17/30038* (2013.01)
USPC ................. 725/23; 725/32; 725/46; 725/97; 705/14.55; 705/14.4; 709/225

(58) Field of Classification Search
None
See application file for complete search history.

(56) References Cited

U.S. PATENT DOCUMENTS

| | | | | |
|---|---|---|---|---|
| 6,496,981 | B1 * | 12/2002 | Wistendahl et al. | 725/112 |
| 8,006,262 | B2 * | 8/2011 | Rodriguez et al. | 725/37 |
| 8,006,273 | B2 * | 8/2011 | Rodriguez | 725/86 |
| 2004/0101138 | A1 * | 5/2004 | Revital et al. | 380/210 |
| 2007/0220566 | A1 * | 9/2007 | Ahmad-Taylor | 725/89 |
| 2008/0115178 | A1 * | 5/2008 | Godin | 725/97 |
| 2008/0177860 | A1 * | 7/2008 | Khedouri et al. | 709/217 |
| 2009/0119708 | A1 * | 5/2009 | Harrar et al. | 725/39 |
| 2009/0172726 | A1 * | 7/2009 | Vantalon et al. | 725/32 |
| 2009/0172747 | A1 * | 7/2009 | Vantalon et al. | 725/61 |
| 2009/0172758 | A1 * | 7/2009 | Vantalon et al. | 725/110 |
| 2009/0217324 | A1 * | 8/2009 | Massimi | 725/46 |
| 2010/0161580 | A1 | 6/2010 | Chipman et al. | 707/706 |
| 2010/0287609 | A1 * | 11/2010 | Gonzalez et al. | 726/14 |
| 2010/0332615 | A1 * | 12/2010 | Short et al. | 709/217 |
| 2011/0103374 | A1 * | 5/2011 | Lajoie et al. | 370/352 |
| 2011/0219229 | A1 * | 9/2011 | Cholas et al. | 713/168 |

(Continued)

OTHER PUBLICATIONS

Erol, Berna, Jonathan J. Hull, and Dar-Shyang Lee. "Linking multi-media presentations with their symbolic source documents: algorithm and applications." Proceedings of the eleventh ACM international conference on Multimedia. ACM, 2003.*

(Continued)

*Primary Examiner* — Gurkanwaljit Singh

(57) ABSTRACT

A method may include receiving a request, from a user device, associated with accessing a multi-media asset/content, identifying a location associated with the user device and identifying a profile for a subscriber associated with the user device. The method may also include determining whether the multi-media asset/content is available, identifying, based on the location, a content distribution network or network device to deliver the first multi-media asset/content, and identifying, based on the profile, advertisements associated with the multi-media content or asset. The method may further include inserting the identified advertisements into the multi-media asset/content and providing, via the identified content distribution network or network device, the multi-media asset/content to the user device.

17 Claims, 7 Drawing Sheets

(56) References Cited

U.S. PATENT DOCUMENTS

| | | | |
|---|---|---|---|
| 2011/0225417 A1* | 9/2011 | Maharajh et al. | 713/150 |
| 2011/0281517 A1* | 11/2011 | Ukkadam | 455/3.06 |
| 2011/0317979 A1* | 12/2011 | Smith et al. | 386/241 |
| 2012/0023535 A1* | 1/2012 | Brooks | 725/110 |
| 2012/0210342 A1* | 8/2012 | Gonzalez et al. | 725/25 |
| 2012/0233138 A1* | 9/2012 | Nijim et al. | 707/701 |
| 2013/0014151 A1* | 1/2013 | Tallapaneni et al. | 725/23 |

OTHER PUBLICATIONS

Unsal, Osman S. System-level power-aware computing in complex real-time and multimedia systems. Diss. University of Massachusetts Amherst, 2003.*

Yuan, Yufei, Milena Head, and Mei Du. "The effects of multimedia communication on web-based negotiation." Group Decision and Negotiation 12.2 (2003): 89-109.*

* cited by examiner

SESSION MANAGER

BACKGROUND INFORMATION

Consumer demand for media is increasing. For example, consumers often watch and/or listen to various media at home, while traveling, at work, etc. As a result, the number of communication channels for delivering media content and the number of different types of devices for playing the content has also increased.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to an infrastructure for allowing customers to request content, such as multimedia content, and receive the content from a service provider. The infrastructure dynamically evaluates the customer's request and performs various decision-making associated with the request in a manner that is transparent to the customer. For example, the infrastructure may include a service session manager that identifies the customer's location, the type of device upon which the customer will play the content, profile information associated with the customer and quality of service factors associated with a number of available devices/networks to provide the service. The infrastructure may coordinate the selection of an optimal network device/system to provide the content to the customer in real time or near real time.

Figure 1:
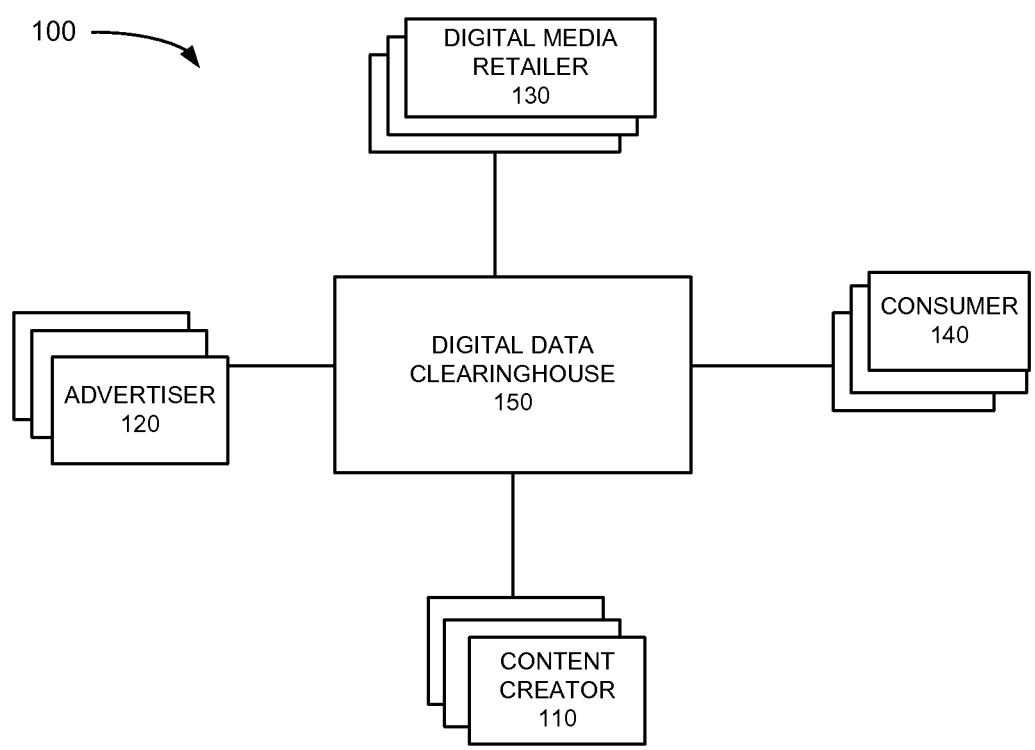
FIG. 1 schematically illustrates an exemplary network in which systems and methods described herein may be implemented.

FIG. 1 is a block diagram of an exemplary network in which systems and methods described herein may be implemented. Referring to FIG. 1, network 100 includes one or more content creators 110, one or more advertisers 120, one or more digital media retailers (DMRs) 130, one or more consumers 140 and digital data clearinghouse (DDC) 150. The exemplary configuration illustrated in FIG. 1 is provided for simplicity. It should be understood that a typical network may include more or fewer devices than illustrated in FIG. 1.

Content creator 110 (referred to collectively as content creators 110 or individually as content creator 110) may represent one or more creators of content that wish to package and/or distribute the content to other parties, such as consumers 140. For example, content creators 110 may include movie or television studios, music companies, publishers, game developers, parties who generate user generated content (UGC), websites, blogsites, etc. Content creators 110 may provide content to DDC 150 for transcoding, packaging and/or distribution, as described in detail below. The term "content," as used herein, may include any type of media, such as video, audio, multi-media, textual data, etc. The term "content" may also be referred to herein as "video assets" or "assets."

Advertiser 120 (referred to collectively as advertisers 120 or individually as advertiser 120) may represent one or more parties that wish to insert advertising into media files. For example, advertiser 120 may contract with a content creator 110 and/or digital media retailer 130 to insert an advertisement into a media stream provided to consumers 140. DDC 150 may insert the advertisement into the stream in accordance with the agreement between the parties.

DMR 130 may represent one or more business entities that receive media content from various parties and resell it to end users. For example, DMRs 130 may include broadcasters, cable companies, direct broadcast satellite (DBS) providers, Internet protocol television (IPTV) providers, mobile phone TV providers, online retailers, etc. DMRs 130 may receive media content from DDC 150 and sell/provide the content to consumers 140.

Consumer 140 may represent one or more consumers 140 that receive content originally generated by or provided by content creators 110 and that has been processed by DDC 150. For example, DDC 150 may format and package content for distribution by DMRs 130 and/or DDC 150 to consumers 140.

DDC 150 may include a server/computing device or a set of servers/computing devices associated with, for example, processing media content. For example, as described briefly above, DDC 150, also referred to herein as DDC platform 150, may provide an automated environment in which content from content creators 110 is transformed and packaged for distribution in any number of formats, based on the particular requirements associated with DMRs 130. In an exemplary implementation, DDC 150 may also aggregate various data and insert advertisements into the media content. DDC 150, consistent with implementations described herein, may also utilize flexible workflows to streamline the formatting and packaging of content for digital distribution.

As described above, the exemplary configuration illustrated in FIG. 1 is provided for simplicity. It should be understood that a typical network may include more or fewer devices than illustrated in FIG. 1. For example, it should be understood that network 100 may include a large number (e.g., hundreds or thousands) of different types of user devices associated with consumers 140, such as televisions, cellular telephones, personal computers (PCs), laptop computers, tablet computers, notebook computers, netbook computers, personal digital assistants (PDAs), etc.

It should also be understood network 100 may include one or more wired, wireless and/or optical networks (not shown) that interconnect the components illustrated in FIG. 1 and enable the components in FIG. 1 to communicate with one another. For example, network 100 may include one or more public switched telephone networks (PSTNs) or other type of switched network. Network 100 may also include one or more wireless networks and may include a number of transmission towers for receiving wireless signals and forwarding the wireless signals toward the intended destination. Network 100 may further include one or more satellite networks, one or more packet switched networks, such as an Internet protocol (IP) based network, a local area network (LAN), a wide area network (WAN), an intranet, the Internet, or another type of network that is capable of transmitting data from a source device to a destination device.

Further, various functions are described below as being performed by particular components in network 100. In other implementations, various functions described below as being performed by one device may be performed by another device or multiple devices, and various functions described as being performed by multiple devices may be combined and performed by a single device.

Figure 2:
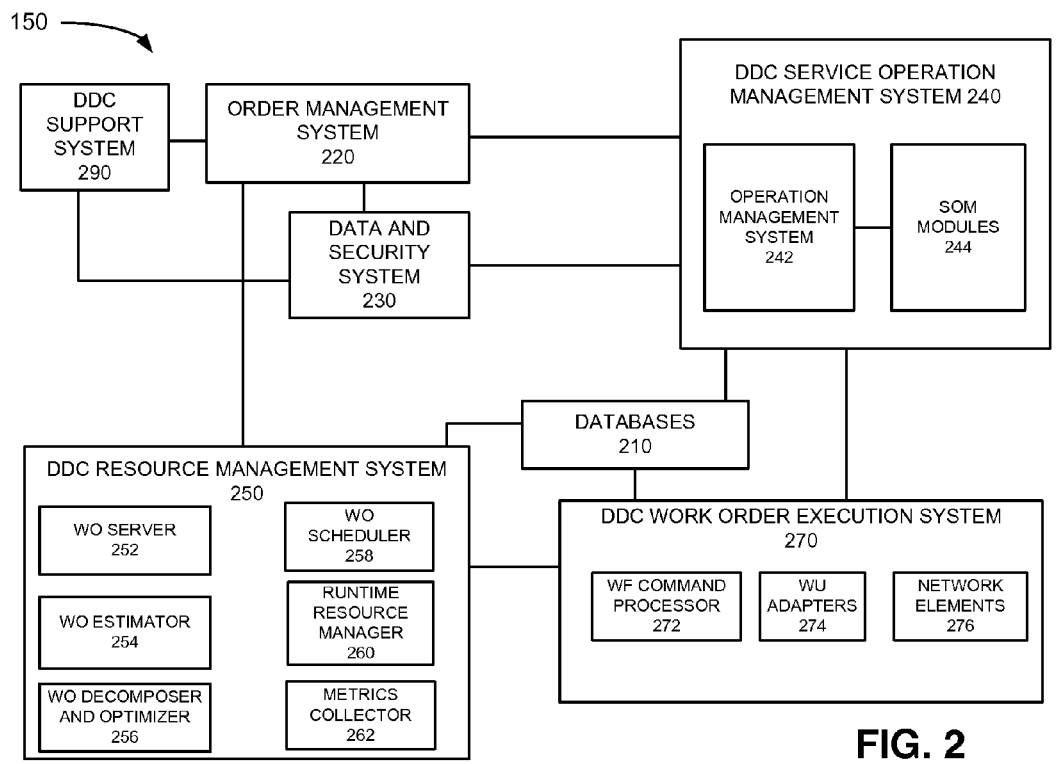
FIG. 2 illustrates an exemplary architecture associated with one of the components of FIG. 1.

FIG. 2 illustrates an exemplary configuration of a portion of DDC 150. Referring to FIG. 2, DDC 150 may include databases 210, order management system 220, data and security system 230, DDC service operation management (SOM) system 240, DDC resource management system 250, DDC work order execution (WOE) system 270 and DDC support system 290.

Databases 210 may store work unit definitions, workflows, parameters, tables that are associated with various components in DDC 150, intermediate or end results of processing performed by different processes in DDC 150, etc. The term "work unit," as used herein, may refer to a description of a set of one or more operations that a system may perform on content (e.g., overlaying subtitles on a video, inserting advertisements into a video, reformatting a video, etc.).

Order management system 220 may include one or more computing devices or servers for managing customer orders, generating reports, etc. In an exemplary implementation, order management system 220 may include client components that interface with components on DDC service operation management system 240. The client components (e.g., web browser) may receive customer orders, requests for reports, etc., and relay the received information to the components on DDC service operation management system 240 for the creation, validation, estimation, submission, approval, execution and reporting of activities associated with the customer orders, request for reports, etc. For example, a customer order may be completed by sending, to a component on DDC service operation management system 240, a selection of a particular workflow that will drive the processing of content associated with the order.

Data and security system 230 may include one or more computing devices or servers that provide for authentication and authorization of users having roles in DDC 150 and/or for taking actions that are associated with the authorized roles (e.g., create user accounts, remove user accounts, generate an initial password, etc.). For example, when a user logs in as a DDC operator, the user may be authorized to design work units and/or compose workflows. In an exemplary implementation, data and security system 230 may interface with order management system 220, DDC SOM system 240 and DDC support system 290.

DDC service operation management (SOM) system 240 may include one or more servers or computing devices to control the overall operation, configuration, and management of DDC 150. For example, DDC SOM system 240 may include operation management system 242 and SOM modules 244. Via a client component that communicates with operation management system 242, a user may control the configuration, administration and operation of DDC 150. For example, in one implementation, via a web browser or another client application, a user may control security, compose a workflow, administer accounts that are associated with content creator 110 or DMR 130, submit a work order, add data and storage to DDC 150, manage resources, manage DDC configuration (e.g., create a work unit), manage catalogs of content, run reports, monitor DDC work order (e.g., information associated with a work order), etc.

In providing each of such services to a client, operation management system 242 may employ SOM modules 244. SOM modules 244 may include components/modules that correspond to the above-listed services. For example, SOM modules 244 may include a security manager, workflow manager, account manager, work order manager, data and storage manager, resource management module, configuration manager, asset management module, catalog management module, monitoring and reporting module, etc. DDC SOM system 240 may further include an operational graphical user interface (GUI) for interfacing with SOM modules.

DDC resource management system 250 may include one or more servers or computing devices that support the capacity management of resources associated with network elements (NEs) in DDC 150. As illustrated in FIG. 2, DDC resource management system 250 may include work order (WO) server 252, WO estimator 254, WO decomposer and optimizer 256, WO scheduler 258, runtime resource manager 260 and metrics collector 262. Components 252-262 may aid in scheduling and allocating resources associated with fulfilling customer orders, as described in detail below.

WO server 252 may provide work order-related interfaces to operation management system 242 and/or SOM modules 244, and may communicate with WO estimator 254, WO decomposer and optimizer 256, and WO scheduler 258 to submit, decompose, validate, and save work orders, and to estimate, schedule, and reserve resources during the order submission.

Work order estimator 254 may estimate the cost of completing a decomposed work order across work units of a workflow, based on resources that are associated with the work units for each resource type. Work order estimator 254 may store the cost in one of databases 210 in terms of resource capacity units (RCUs) and duration of time required to complete tasks or processes that are associated with the work order.

WO decomposer and optimizer 256 may break down an order into work units based on the workflow associated with the order. Furthermore, based on the decomposition, WO decomposer and optimizer 256 may generate work unit tasks, or simply "tasks," assign task parameters, and create task connectors, which are described below.

WO scheduler 258 may match cost estimates for different resource types for a work order to available time slots in an allocation schedule across different network elements (e.g., hardware/software components that perform underlying operations for a work unit). As a result of the scheduling, WO scheduler 258 may output start and end times for each of the work unit tasks and for resource reservations.

Runtime resource manager 260 may allocate network elements/user groups to a process at the time of execution on behalf of a work unit. Runtime resource manager 260 may attempt to honor scheduled reservations of resources. However, if the resources are unavailable, runtime resource manager 260 may attempt to obtain replacement resources.

Metrics collector 262 may determine, for each work unit, actual time of completion and used/consumed resources associated with the execution of the work unit. Based on previous actual execution measurements, metrics collector 262 may modify factors that are used to estimate the resource and time necessary to complete a task associated with a work unit for a particular asset.

In an exemplary implementation, resource management system 250 may represent the functions performed by various NEs used to execute work order tasks as resource types and represent the capacity of the NEs using resource capacity units (RCUs). The term "resource type," as used herein, may include categories of consumable network resources used to schedule, reserve, bill and manage network capacity.

Examples of resource types include bandwidth, storage, the ability to transcode an asset from one format into another format. Resource types may also include resources associated with humans involved in the processing of assets, such as a human's ability to review a movie asset, etc. The term "RCU", as used herein, may include the unit of measure for a resource type. Examples of RCUs include megabits for bandwidth, gigabytes for storage, transcoding task units and/or CPU processing time for transcoding operations, etc.

DDC work order execution (WOE) system 270 may include one or more servers or computing devices to manage the flow and execution of work units of a defined workflow associated with a work order. DDC WOE system 270 may include a workflow (WF) command processor 272 (also referred to herein as command processor 272), work unit (WU) adapters 274, and network elements 276. For simplicity, FIG. 2 does not show other components of WOE system 270. Depending on the implementation, DDC WOE system 270 may include additional, fewer, or different components than those illustrated in FIG. 2. For example, WOE system 270 may include a work unit processor (not shown).

Command processor 272 may drive work order execution. Command processor 272 may include a WO manager and WO processor. The WO manager may provide interfaces to resource management system 250 for initiating an execution of a work order, retrieving the status of the work order, suspending/resuming the work order execution, canceling the work order, etc. The WO processor may coordinate work unit tasks for completion of a work order. In coordinating different work unit tasks, the WO processor may sequence the tasks for optimum execution time and resource utilization. The WO processor may communicate with runtime resource manager 260 for allocation and de-allocation of resources. The work unit processor may dispatch processes/threads to perform a work unit task.

Work unit adapter 274 may include interfaces for adapting network elements to perform media content processing corresponding to a work unit. In one implementation, each work unit adapter 274 may be versioned and may include Java code. Each work unit adapter 274 may monitor the corresponding network element to prevent over-allocation of the network element, maintain normal execution of logic associated with the network element, and provide real-time information to metrics collector 262.

Network elements 276 may include physical or logical network devices/components for processing media content.

DDC support system 290 may include one or more servers or computing devices and/or personnel to provide support services, such as creation of work units, composition of workflows, etc., billing support, contracting management, pricing, etc.

The configuration shown in FIG. 2 is for illustrative purposes. In other configurations and/or implementations, functions that are associated with one component or system shown in FIG. 2 may be performed by one or more other components in FIG. 2, any of the components may be connected to any other of the components, and functions of one component may be included in another component. Accordingly, in the other configurations or implementations, DDC 150 may include additional, fewer, different, or a different arrangement of components than those illustrated in FIG. 2.

Figure 3:
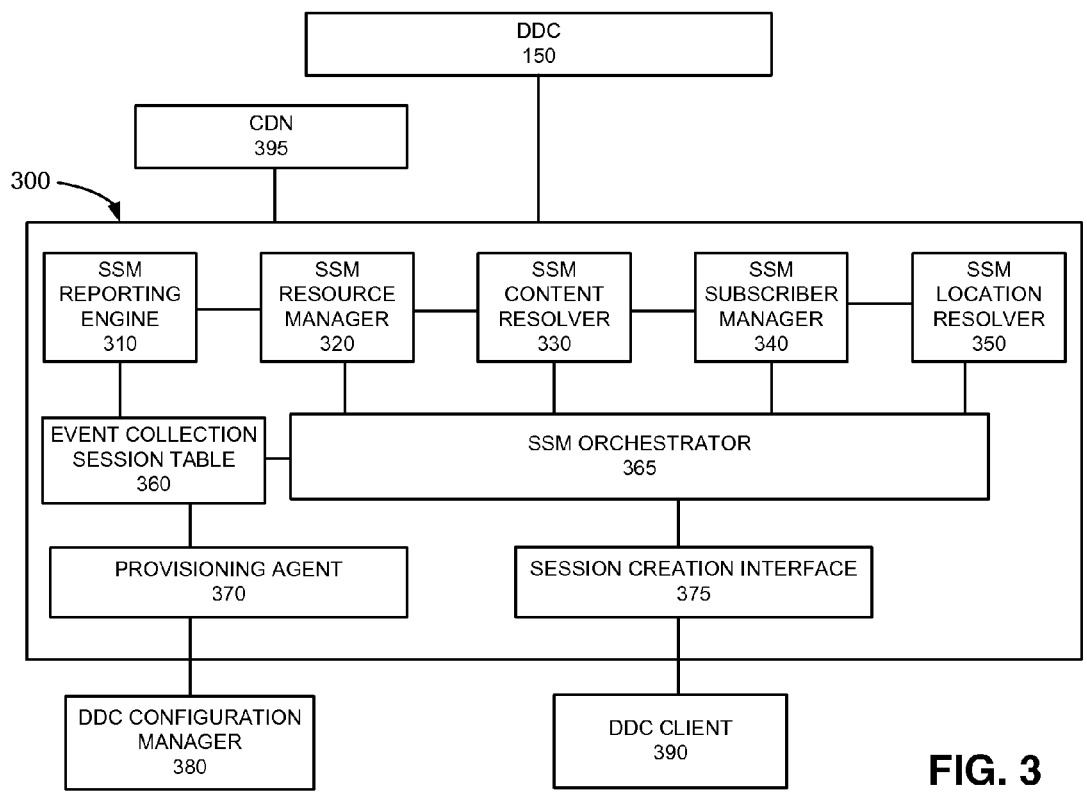
FIG. 3 illustrates an exemplary configuration of a service session manager in which systems and methods described herein may be implemented.

As described above, DDC 150 may provide an automated environment in which content from content creators 110 is transformed and packaged for distribution in any number of formats, based on the particular requirements associated with DMRs 130, consumers 140 and/or other devices, systems, etc. FIG. 3 illustrates an exemplary configuration of service session manager (SSM) 300 which manages the establishment and control of live streaming, linear streaming and video on demand services to the end customer, such as consumers 140 (e.g., customers), by coordinating the signaling between the end customer, front end/store front associated with DDC 150 and a delivery network responsible for delivering the desired content. SSM 300 acts as the point of contact from a customer initiating a content fulfillment request associated with an asset processed, for example, by DDC 150.

For example, SSM 300 receives a customer request and responds to a client device associated with the customer with an appropriate Uniform Resource Locator (URL) to provide access to the requested content. The URL may be returned to the client device as a link to a playlist (or a playlist), a manifest or an actual content file, depending on the type of content being requested, as described in detail below.

Referring to FIG. 3, SSM 300 includes SSM reporting engine 310, SSM resource manager 320, SSM content resolver 330, SSM subscriber manager 340, SSM location resolver 350, event collection session table 360, SSM orchestrator 365, provisioning agent 370 and session creation interface 375. SSM 300 may interface with DDC 150 (also referred to herein as DDC core 150), DDC configuration manager 380, DDC client 390 and content distribution network (CDN) 395. In an exemplary implementation, SSM 300 receives a request for media delivery from DDC client 390, such as a unicast delivery request, and provides a response with an appropriate URL.

SSM orchestrator 365 manages communication with other components in SSM 300 in real time or near real time. SSM orchestrator 365 also acts as the point of communication between client devices and orchestrates data flow between the SSM subcomponents (e.g., components 310-350). For example, SSM orchestrator 365 accepts session creation requests from client devices, such as DDC client 390. The requests may include a content identifier, a client device identifier and location information associated with the client device. SSM orchestrator 365 may use this information to route the request, as described in detail below.

SSM reporting engine 310 serves as the interface between components responsible for event collection and analysis and other components of SSM 300, such as SSM resource manager 320, whose operation is dependent on the data generated by the event collection and analysis components/framework. SSM reporting engine 310 is also responsible for notifying DDC core 150 of session status changes, providing SSM resource manager 320 with data regarding CDN loading and operational status, and populating event collection session table 360 with session creation/deletion records.

SSM resource manager 320 may be responsible for maintaining the status of available CDNs, such as CDN 395, based upon received operational events from the CDNs, and prioritizing sessions when a requested asset is available on more than one CDN. For example, DDC core 150 may interface with a number of CDNs and SSM 300 is configured/adaptable to the interface capabilities of various CDNs to allow for efficient delivery of assets, as described in more detail below. For example, SSM resource manager 320 may evaluate quality of service (QoS) issues with respect to a number of CDNs, as well as network efficiency with respect to using a particular CDN over other CDNs that may be able to provide the desired asset. SSM resource manager 320 may also dynamically and in real time identify the customer's location, the type of device upon which the customer will play the content and/or profile information associated with the customer. SSM resource manager 320, along with other components in SSM 300 (e.g., SSM content resolver 330, SSM orchestrator 365) may then select an optimal CDN or server to deliver the requested asset.

SSM resource manager 320 may also be used by SSM orchestrator 365 to create and register authorization tokens or cookies. An authorization token/cookie may be used to grant a client device (e.g., DDC client 390) access to content published on or provided by the CDN.

SSM content resolver 330 is responsible for resolving an asset identifier to a specific manifest/playlist on a preferred CDN. For example, SSM content resolver 330 may interact with SSM resource manager 320 and a DDC asset manager (not shown in FIG. 3) via a content information service (CIS) interface that combines information from a number of DDC sources, such as a DDC playlist builder and a DDC blackout manager. SSM content resolver 330 may also include a live streaming interface with blackout management, and a video on demand (VOD) interface with ad insertion when the particular client profile indicates that ad insertion is enabled.

SSM subscriber manager 340 provides an interface to a DDC user profile service or subscriber information service (SIS) that allows other components in SSM 300 to query, by end user ID/client ID, SSM subscriber manager 340. SSM subscriber manager 340 may provide query results indicating a user's entitlements, home location, registered devices, a "bookmark" for resuming playing of previously accessed content, demographic information associated with an end user/subscriber, etc.

SSM location resolver 350 may be responsible for transforming location services information from a client device (such as a cell ID, global positioning system (GPS) coordinates and/or a device source Internet protocol (IP) address) into, for example, geographic information used by other components in the system. For example, SSM location resolver 350 may receive location information and identify a Designated Market Area (DMA) associated with the location. A DMA is a standardized geographic area defined by Nielsen Media Research as a group of counties that make up a particular television market. In other instances, SSM location resolver 350 may use received location information to generate a Geographic Region Code (GRC) associated with the location. A GRC defines a mapping of zip codes to a content provider-defined area for the purpose of defining blackout regions. In still other instances, SSM location resolver 350 may use received location information to generate Federal Information Processing Standard (FIPS) state and region codes defined by United States Government. The FIPS codes may be used by DDC core 150 primarily to target Emergency Alert System (EAS) messages at affected subsets of viewers. SSM location resolver 350 may also use the received location information to generate a CDN coverage area (CCA). The CCA may be used for CDN selection. SSM location resolver 350 may also use the received location information to generate an advertisement zone associated with one or more DMRs.

Event collection session table 360 may be populated by SSM orchestrator 365 and may store session records generated during session creation. Once the records have been created, SSM orchestrator 365 (or other components, such as a data collector) may periodically update table 360 with information about a user's interaction with the CDN. For example, table 360 may include statistics, such as the number of chunks pulled, duration of time since a session was created, total number of bytes transferred, etc.

Provisioning agent 370 may receive information from DDC configuration manager 380 and store appropriate information in event collection session table 360. Provisioning agent 370 may also be responsible for restarting SSM 300. For example, if a system administrator wishes to modify the configuration of SSM 300, he/she may update the configuration via DDC configuration manager 380, place SSM 300 in an offline state, route traffic around SSM 300, and force a reset via provisioning agent 370.

DDC configuration manager 380, as described above, may be used to modify/update the configuration of SSM 300 via provisioning agent 370. For example, DDC configuration manager 380 may signal provisioning agent 370 to bring SSM 300 into an offline state and force a reset with the new configuration.

Session creation interface 375 may act as a user interface for customers interacting with SSM 300, such as a customer associated with DDC client 390. For example, session creation interface 375 may provide a customer associated with DDC client 390 with a catalog or menu of video assets from which a customer can select a particular asset, as described in more detail below.

DDC client 390 (also referred to herein as client 390) may correspond to consumer 140 (FIG. 1) and may be associated with a customer or subscriber to services associated with DDC 150. DDC client 390 may include any device that is able to output and display media, such as a personal computer (PC), laptop computer, tablet computer, netbook, home theater PC (HTPC), a television, a set top box, a personal digital assistant (PDA), a web-based appliance, a mobile terminal (e.g., a cellular telephone), a game playing device, a music/multi-media playing device, etc., that is able to receive incoming data and decode the incoming data for output to a display, which may be included with DDC client 390. In an exemplary implementation, DDC client 390 may request content from SSM 300 and receive multi-media data in response to the request, as described in detail below.

CDN 395 may represent one or more content distribution networks that are available to provide a requested asset to DDC client 390. For example, CDN 395 may include one or more computing devices or server devices, one or more routing devices, etc., that are associated with one or multiple CDNs that are available to provide assets, such as streaming content, VOD content, etc., to DDC client 390.

Figure 4:
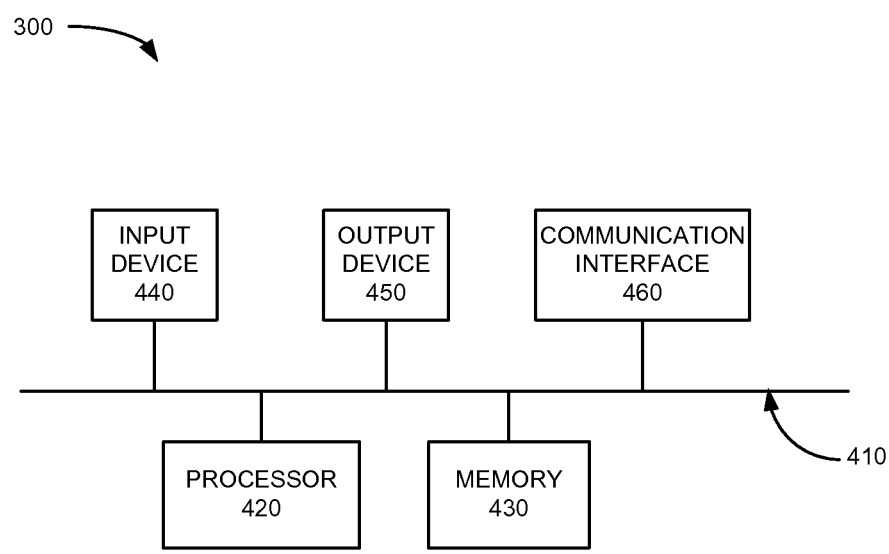
FIG. 4 illustrates an exemplary configuration of one or more of the components of FIG. 3.

FIG. 4 illustrates an exemplary configuration of one or more devices on which SSM 300, components of SSM 300 and/or other components illustrated in FIG. 3 may be implemented. For example, one or more of SSM reporting engine 310, SSM resource manager 320, SSM content resolver 330, SSM subscriber manager 340, SSM location resolver 350, SSM orchestrator 365, provisioning agent 370, DDC configuration manager 380 and DDC client 390 may be implemented on one or more devices configured as illustrated in FIG. 4. Other components in system 100 (FIG. 1), such as components in DDC 150 (e.g., order management system 220, data and security system 230, DDC SOM system 240, DDC work order execution system 270 and DDC support system 290) may be configured in a similar manner.

Referring to FIG. 4, SSM 300 may include bus 410, processor 420, memory 430, input device 440, output device 450 and communication interface 460. Bus 410 may include a path that permits communication among the elements of SSM 300.

Processor 420 may include one or more processors, microprocessors, or processing logic that may interpret and execute instructions. Memory 430 may include a random access memory (RAM) or another type of dynamic storage device that may store information and instructions for execution by processor 420. Memory 430 may also include a read only memory (ROM) device or another type of static storage device that may store static information and instructions for use by processor 420. Memory 430 may further include a solid state drive (SDD). Memory 330 may also include a magnetic and/or optical recording medium (e.g., a hard disk) and its corresponding drive.

Input device 440 may include a mechanism that permits a user to input information SSM 300, such as a keyboard, a keypad, a mouse, a pen, a microphone, a touch screen, voice recognition and/or biometric mechanisms, etc. Output device 450 may include a mechanism that outputs information to the user, including a display, a printer, a speaker, etc.

Communication interface 460 may include a transceiver for communicating with other devices within SSM 300 or outside SSM 300 (e.g., DDC configuration manager 380, DDC client 390, CDN 395, DDC 150) via wired, wireless or optical mechanisms. Communication interface 460 may also include one or more radio frequency (RF) transmitters, receivers and/or transceivers and one or more antennas for transmitting and receiving RF data via network 100. Communication interface 460 may also include a modem or an Ethernet interface to a LAN or other mechanisms for communicating with elements in a network or system, such as network 100 or SSM 300, or another network/system.

The exemplary configuration illustrated in FIG. 4 is provided for simplicity. It should be understood that devices in SSM 300 may include more or fewer devices than illustrated in FIG. 4. In an exemplary implementation, one or more components of SSM 300 may perform operations in response to processor 420 executing sequences of instructions contained in a computer-readable medium, such as memory 430. A computer-readable medium may be defined as a physical or logical memory device. The software instructions may be read into memory 430 from another computer-readable medium (e.g., a hard disk drive (HDD), SSD, etc.), or from another device via communication interface 460. Alternatively, hard-wired circuitry may be used in place of or in combination with software instructions to implement processes consistent with the implementations described herein. Thus, implementations described herein are not limited to any specific combination of hardware circuitry and software.

As described above, SSM 300 may act as the point of contact with customers that wish to receive/order content. SSM 300 may process the request and provide the content via an appropriate CDN that will deliver the content, as described in detail below.

Figure 5:
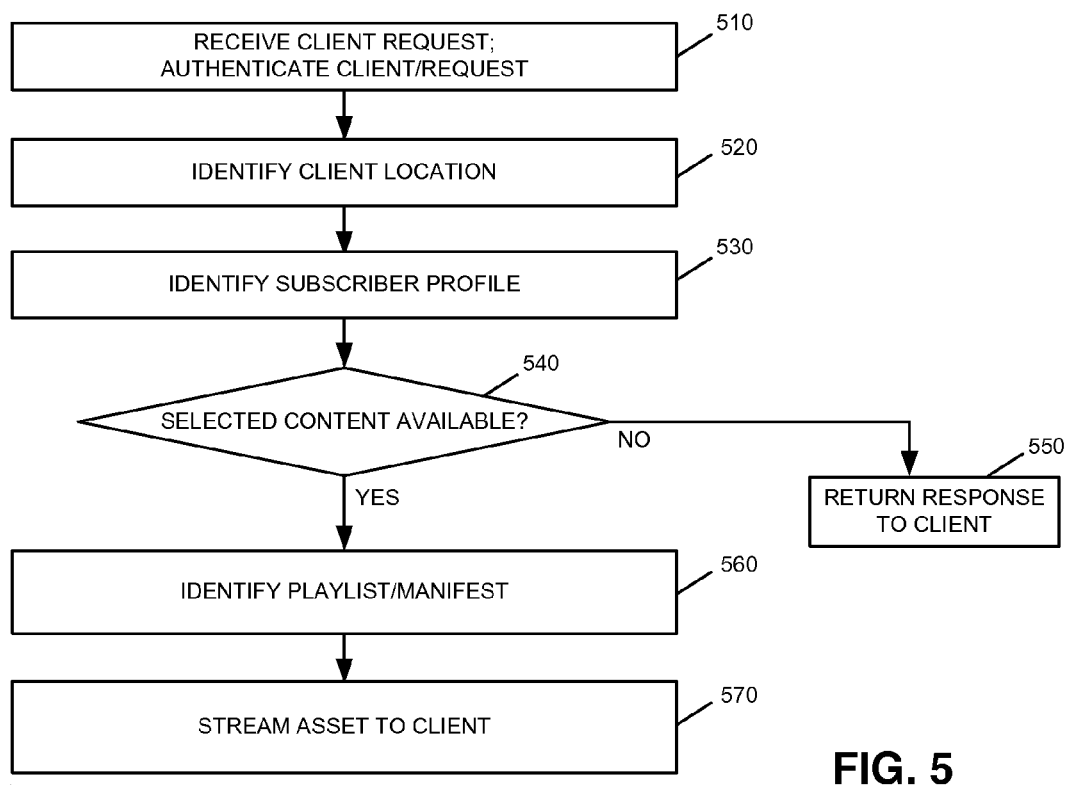
FIG. 5 is a flow diagram illustrating exemplary processing associated with the service session manager of FIG. 3.
Figure 6A:
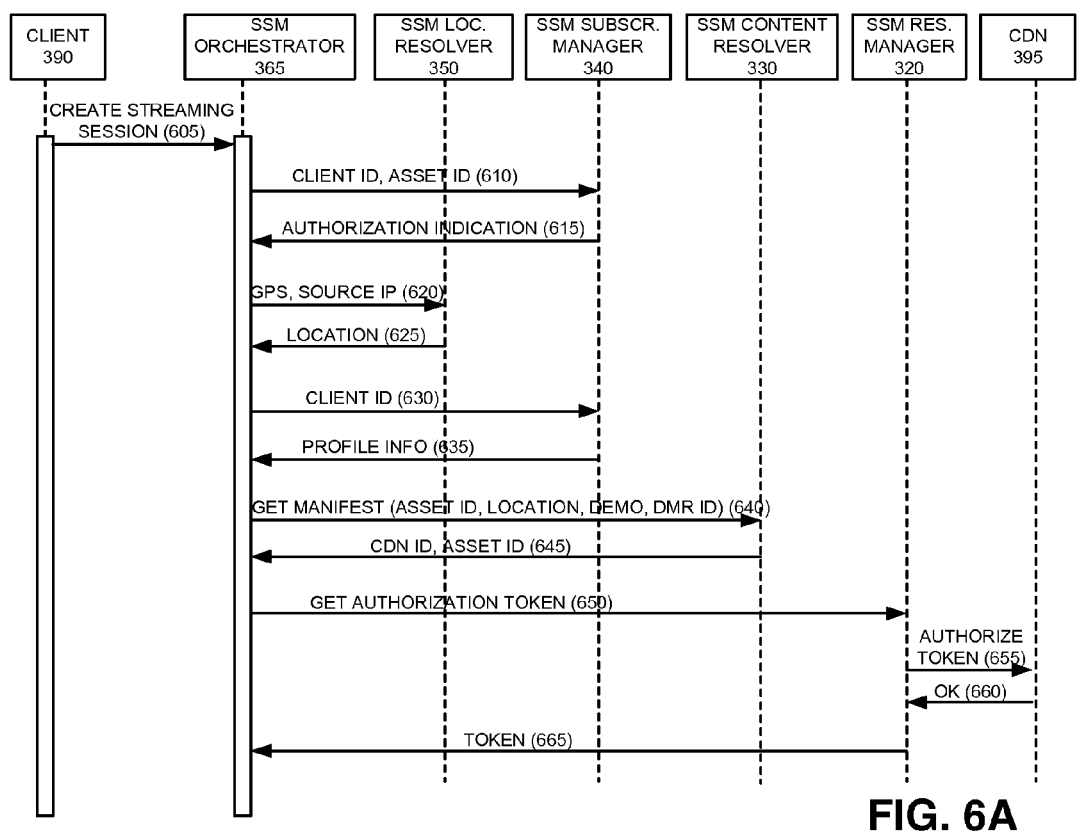
FIGS. 6A and 6B are signal flow diagrams associated with the processing of FIG. 5.
Figure 6B:
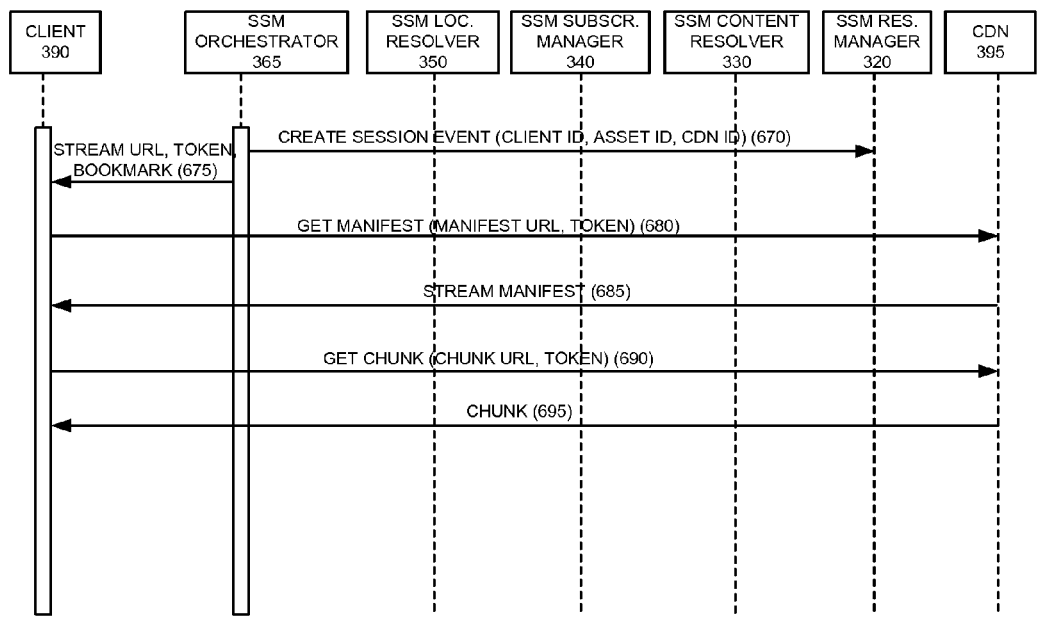

FIG. 5 is an exemplary flow diagram illustrating processing associated with SSM 300 and FIGS. 6A and 6B are exemplary signal flow diagrams associated with the processing in FIG. 5. The processing of FIG. 5 will be described in connection with the signal flow diagrams of FIGS. 6A and 6B. Processing may begin with DDC client 390 interfacing with session creation interface 375 to receive a catalog of choices associated with content that is available via DDC 150. In this example, assume that the user (also referred to herein as the customer or subscriber) associated with DDC client 390 logs into or accesses a "store front" or front end user interface associated with DDC 150 and receives the catalog or menu of choices via a monitor associated with DDC client 390. Further assume that the customer selects a video asset from the catalog provided by session creation interface 375 and that the selection corresponds to the format that is most appropriate with respect to content type supported by client 390. In this case, SSM 300 may not be responsible for negotiating a content type with DDC client 390. In instances where the customer selects a content type that is not compatible with DDC client 390, SSM 300 may identify capabilities associated with DDC client 390 and identify the appropriate content type for DDC client 390 and the appropriate asset type. In either case, assume that SSM orchestrator 365 receives the request from client 390 via session creation interface 375 (FIG. 5, block 510). The request may initiate a streaming session in which the asset will be provided to DDC client 390 (FIG. 6A, 605).

After receiving a content request, SSM orchestrator 365 may authenticate the client/client request (block 510). For example, SSM orchestrator 365 may identify the client requesting the asset and lookup a client ID associated with DDC client 390. SSM orchestrator 365 may also identify the requested content or an asset identifier that corresponds to the selected content and forward the asset ID, along with a client ID associated with DDC client 390 to SSM subscriber manager 340 to determine whether the subscriber is authorized to receive the selected content (610). As an example, if DDC client 390 is requesting to play a SecureMedia-protected, HTTP live streaming (HLS) version of episode 120 of the television show Glee, the content ID may be the following: asset://fox-glee-120/sm-hls. SSM orchestrator 365 may then decompose the content ID to identify both the resource being requested (i.e., Glee #120) and the representation (i.e., SecureMedia DRM over HLS).

SSM subscriber manager 340 may determine whether the client is authorized to receive the content based on the client ID and asset ID to and return an authorization indication to SSM orchestrator 365 (615). If, client 390 is not authorized to receive/view the asset, SSM subscriber manager 340 returns an error response to SSM orchestrator 365, which in turn provides an error response to client 390.

Assume that the subscriber is authorized to receive the asset. In this case, SSM orchestrator 365 identifies a geographic location associated with client 390 (block 520). For example, SSM orchestrator 365 sends GPS information associated with client 390 and/or the IP source address included in the client request to SSM location resolver 350 (620). SSM location resolver 350 receives the GPS and/or IP source information associated with client 390 and identifies the geographic location associated with client 390 (625). For example, as described above, SSM location resolver 350 may identify a DMA, GRC, FIPS state or region code, CCA, advertisement zone, etc. The location information may be used to identify a particular CDN that may be used to provide the asset to client 390, to identify particular local advertisements that may be inserted into the asset, etc.

After receiving the location information, SSM orchestrator 365 may identify subscriber profile information corresponding to the user/subscriber associated with client 390 (block 530). For example, SSM orchestrator 365 may forward the client ID to SSM subscriber manager 340 to identify profile information and/or particular requirements associated with client 390 (630). SSM subscriber manager 340 may retrieve the subscriber's profile and provide the subscriber profile information to SSM orchestrator 365 (635). In an exemplary implementation, the profile information may include a bookmark associated with the asset, if the asset has been previously downloaded/viewed by client 390. The bookmark may allow the subscriber associated with client 390 to resume viewing an asset from the place in the content where he/she previously stopped watching. The profile information may also include demographic information associated with the subscriber, a digital media retailer (DMR) ID, and/or other information associated with the subscriber's profile. The demographic information associated with the subscriber, such as age, sex, etc., may be used to identify and select advertisements that may be appropriate for inserting into the content/asset. The DMR ID may identify a DMR that can provide the desired asset.

SSM orchestrator 365 may receive the profile information and determine whether the selected content is available in a format compatible with client 390 (block 540). For example, SSM orchestrator 365 may forward the asset ID, location, demographic information and/or the DMR ID to SSM content resolver 330 to determine whether the content is available in a format for the supported client type. If the content is not available in the appropriate format for the client type (block 540—no), SSM content resolver 330 may return an indication to SSM orchestrator 365 indicating that the content is not available. SSM orchestrator 365 may then provide a message to client 390 indicating that the content is not available (block 550).

For example, content for many client devices may need to be served from a specific type of delivery network/server. SSM 300 uses the configuration information associated with the asset and client type to identify the appropriate CDN/server. For example, SSM 300 may target the delivery of Microsoft Smooth Streaming of PlayReady encrypted content to Microsoft II S7-compliant servers as the delivery server/network; target the delivery of Adobe Dynamic Streaming with Flash Access encrypted content to Adobe-compliant servers as the delivery server/network; and target the delivery of Adaptive or HLS with Secure Media encrypted content to HLS-compliant servers as the delivery server/network. As a result, if the particular server/delivery network is not currently available, SSM orchestrator 365 will provide a response indicating that the asset is not currently available.

If, however, the content is available on an appropriate delivery network/server (block 540—yes), SSM orchestrator 365 may obtain a playlist or manifest associated with the selected content (block 560). In an exemplary implementation, DDC 150 supports delivery of assets (e.g., video assets) using file downloads and several adaptive bit rate-streaming methods. Each method may introduce slightly different capabilities and nomenclature with respect to identifying assets. For example, asset delivery associated with HLS may use the term "playlist" to refer to the structured document that describes the location of video chunks or segments in various bitrates, while others methodologies refer to this information as a "manifest." For simplicity, the terms playlist and manifest are used interchangeably herein and should be construed in a similar manner herein.

In any event, the playlist may identify the CDN and/or server associated with the CDN that is most appropriate for providing the asset based on, for example, the client location information and/or other information, such as demographic information, preference information associated with a DMR 130, quality of service issues with respect to the CDNs, etc.

In an exemplary implementations, SSM orchestrator 365 may forward the asset ID, location, demographic information and DMR ID to SSM content resolver 330 to obtain the playlist (640). SSM content resolver 330 may receive the information and identify an appropriate CDN and/or server that will provide the desired asset. For example, if two CDNs are available to serve the content and a particular DMR 130 stores a preference to use one of the CDNs over the other CDN, SSM 300 will select the preferred CDN to deliver the content.

SSM content resolver 330 may forward a CDN ID and an asset ID that identifies the appropriate CDN/server that will provide the desired asset (645). Based on the CDN ID and asset ID, SSM orchestrator 365 may generate a manifest associated with the asset.

SSM orchestrator 365 may then communicate with SSM resource manager 320 to request an authorization token associated with streaming the content identified in the manifest to client 390 (650). An authorization token/cookie may be used to grant a client device access to content published on the CDN. SSM resource manager 320 may receive the request and communicate with the identified CDN to request the token. For example, when multiple CDNs are available to fulfill the request, SSM resource manager 320 may identify the client's location, the type of device upon which the client will play the content, profile information associated with the client and quality of service factors associated with a number of CDNs available to provide the requested content. SSM resource manager 320 may dynamically, and in real time, select the optimal CDN to fulfill the request. As an example, the optimal CDN may be selected based on efficiency from a network perspective (e.g., content is available in a desired format/configuration), performance perspective (e.g., highest quality delivery network) and/or cost perspective (e.g., least expensive option). In this example, assume that CDN 395 is identified as the most appropriate CDN to provide the asset. Therefore, SSM resource manager 320 forwards the request to CDN 395 (655). CDN 395 may receive the request and provide the token or an authorization to SSM resource manager 320 (660), which forwards the token to SSM orchestrator 365 (665).

SSM orchestrator 365 may then create a session event with SSM resource manager 320. For example, SSM orchestrator 365 may communicate the client ID, asset ID and CDN ID to SSM resource manager 320 (FIG. 6B, 670). SSM orchestrator 365 may also stream a URL associated with the location of the appropriate CDN from which the asset will be provided, along with a token and bookmark associated with the asset (if the asset was previously viewed by the user associated with client 390) to client 390 (675).

Client 390 may contact CDN 395 to obtain the manifest. For example, client 390 may use the received URL, token and/or bookmark to obtain the manifest associated with the desired asset from CDN 395 (680). CDN 395 may receive the manifest request from client 390, along with the token and stream the manifest back to client 390 (685). For example, CDN 395 may provide the URL of the manifest or file along with a bookmark or "chunk" index. The bookmark/chunk index may identify the point at which a previous viewing of the asset by client device 390 stopped viewing the content.

Client 390 may then identify any bookmarks associated with the manifest (e.g., if a portion of the asset was previously viewed) and contact CDN 395 to obtain the appropriate asset and/or portion of the appropriate asset from CDN 395. For example, client 390 may use a URL identifying CDN 395 and information identifying the portion or chunk of asset at which viewing is to begin, along with the token, to connect with CDN 395 and request the asset or portion of the asset (690). CDN 395 may receive the request, determine that the token allows access to the desired asset and stream the asset/chunk to client 390 (block 570; FIG. 6B, 695).

In this manner, SSM 300 may interact with a customer and provide the desired asset in real time or near real time. In some implementations, SSM 300 and/or DDC 150 may support the delivery of multiple assets/streams to multiple client devices associated with the subscriber simultaneously. That is, a television associated with the subscriber may receive a first asset, while a mobile telephone associated with the subscriber may receive a different asset at the same time that the television is receiving the first asset.

Implementations described provide an infrastructure that allows customers to request media content and receive the content from a service provider. By dynamically analyzing the request and other information associated with the request, such as the customer's location and network capabilities, the infrastructure may provide the selected content in an efficient manner that is consistent with client device requirements, as well as provide the content to the customer over an optimal network device/system.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to SSM 300 performing various tasks to process requests and facilitate delivery of selected content to subscribers. In other implementations, other components, systems, platforms, etc., in, for example, DDC 150 may perform some or all of these tasks. In addition, in some implementations, network 100 may include multiple SSMs 300 and/or DDCs 150.

In addition, although not described above in detail, SSM orchestrator 365 may interact with advertisement placement servers and/or other devices prior to content being provided to client 390 to determine whether any binding, overlays or network side advertisement processing is required. If so, SSM orchestrator 365 may pass the advertisement placement opportunity information that it has received from one or more content information servers (CISs) to an ad decision manager (ADM) for advertisement selection. The ad selection may be based on, for example, the customer profile, demographic information associated with the customer, the time of day, etc. SSM orchestrator 365 may pass the content information and ad information to a manifest builder/re-builder which creates a combined/merged manifest specific to the subscriber that will include the particular advertisements or include links to the particular advertisements. SSM orchestrator 365 may also determine localized blackout requirements associated with live events that preclude a customer from receiving a requested asset.

Further, while series of acts have been described with respect to FIG. 5 and series of signal flows have been described with respect to FIGS. 6A and 6B, the order of the acts and/or signal flows may be varied in other implementations. Moreover, non-dependent acts or signal flows may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
receiving a request, from a user device, for accessing a first multi-media asset or content;
identifying a location associated with the user device;
identifying a profile for a subscriber associated with the user device;
determining whether the first multi-media asset or content is available in a format compatible with the user device;
identifying, based on the location and in response to determining that the first multi-media asset or content is available in a format compatible with the user device, a content distribution network or network device from a plurality of content distribution networks or network devices to deliver the first multi-media asset or content to the user device;
identifying, based on the profile, advertisements associated with the first multi-media asset or content;
inserting the identified advertisements into the first multi-media asset or content;
providing a uniform resource locator (URL) and an authorization token to the user device, wherein the URL is associated with the identified content distribution network or network device and the authorization token allows the user device to receive the first multi-media asset or content via the identified content distribution network or network device;
receiving, from the user device, the authorization token at the identified content distribution network or network device;
determining, based on the authorization token, whether to provide the first multi-media asset or content to the user device; and
providing, via the identified content distribution network or network device, the first multi-media asset or content to the user device in response to determining to provide the first multi-media asset or content.

2. The computer-implemented method of claim 1, wherein the identifying a location associated with the user device comprises at least one of:
identifying a geographic region code (GRC), a Federal Information Processing Standard (FIPS) state or region code, a content distribution network coverage area, or an advertisement zone.

3. The computer-implemented method of claim 2, wherein the identifying advertisements associated with the first multi-media asset or content comprises:
identifying advertisements based on at least one of the GRC, the FIPS state or region code, the content distribution network coverage area, or the advertisement zone.

4. The computer-implemented method of claim 1, further comprising:
identifying, prior to providing the first multi-media asset or content, a bookmark associated with the first multi-media asset or content, wherein the bookmark identifies a point at which a previous providing of the first multi-media asset or content to the user device was stopped;
providing the bookmark to the user device with the URL and the authorization token;

receiving, from the user device, the bookmark at the identified content distribution network or network device; and providing the first multi-media asset or content to the user device beginning at a point corresponding to the bookmark.

5. The computer-implemented method of claim 4, further comprising:
providing, to the user device, a user interface identifying a plurality of multi-media assets or content.

6. The computer-implemented method of claim 5, further comprising:
receiving, via the user interface, a selection from the user device identifying the first multi-media asset or content; and
identifying a content type associated with the first multi-media asset or content that is compatible with the user device.

7. The computer-implemented method of claim 1, wherein the first multi-media asset or content comprises broadcast content or a video on demand content, the method further comprising:
streaming the broadcast content to the user device or downloading the video on demand content to the user device via the identified content distribution network or network device.

8. The computer-implemented method of claim 1, wherein the identifying a content distribution network or network device comprises:
identifying an optimal content distribution network or network device to provide the first multi-media asset or content, based on the location associated with the user device and the profile for the subscriber, wherein the profile identifies a type associated with the user device.

9. The computer-implemented method of claim 8, wherein the identifying an optimal content distribution network or network device further comprises selecting the optimal content distribution network or network device based on at least one of:
quality of service factors associated with providing the first multi-media asset or content,
network performance factors associated with providing the first multi-media asset or content, or
a preference associated with a media retailer associated with the first multi-media asset or content.

10. A system, comprising:
a memory configured to store information identifying a plurality of stored media files; and
at least one processing device configured to:
receive a request, from a user device, associated with accessing a first one of the stored media files,
identify a location associated with the user device,
identify a profile for a subscriber associated with the user device,
determine whether the first media file is available in a format compatible with the user device,
identify, based on the location and in response to determining that the first media file is available in a format compatible with the user device, a content distribution network or network device from a plurality of content distribution networks or network devices to deliver the first media file to the user device,
provide a uniform resource locator (URL) and an authorization token to the user device, wherein the URL is associated with the identified content distribution network or network device and the authorization token allows the user device to receive the first media file via the identified content distribution network or network device,
receive, from the user device, the authorization token,
determine, based on the authorization token, whether to provide the first media file, and
provide, via the identified content distribution network or network device, the first media file to the user device in response to determining to provide the first media file.

11. The system of claim 10, wherein the at least one processing device is further configured to:
identify, based on the profile, advertisements associated with the first media file, and
insert the identified advertisements into the first media file.

12. The system of claim 10, wherein when identifying a location associated with the user device, the at least one processing device is further configured to:
identify a geographic region code (GRC), a Federal Information Processing Standard (FIPS) state or region code, a content distribution network coverage area, or an advertisement zone, and
wherein the at least one processing device is further configured to:
identify advertisements to insert in the first media file based on at least one of the GRC, the FIPS state or region code, the content distribution network coverage area, or the advertisement zone.

13. The system of claim 10, wherein the at least one processing device is further configured to:
identify, prior to providing the first media file, a bookmark associated with the first media file,
provide the bookmark to the user device with the URL and the authorization token,
receive, from the user device, the bookmark at the identified content distribution network or network device, and
provide the first media file to the user device beginning at a point corresponding to the bookmark.

14. The system of claim 10, wherein when identifying the content distribution network or network device, the at least one processing device is configured to:
identify an optimal content distribution network or network device to provide the first media file, based on the location associated with the user device and the profile for the subscriber, wherein the profile identifies a type associated with the user device.

15. The system of claim 14, wherein when identifying an optimal content distribution network or network device, the at least one processing device is further configured to:
determine quality of service parameters associated with the plurality of content distribution networks or network devices,
identify a preference associated with a retailer associated with the first media file, and
select the content distribution network or network device based on the determined quality of service parameters and the identified preference.

16. A method, comprising:
receiving a request, from a user device, associated with accessing a first media asset;
identifying a location associated with the user device;
identifying a profile for a subscriber associated with the user device;
determining whether the first media asset is available;
identifying, based on the location, determining that the first media asset is available and a type associated with the first media asset, a network device from a plurality of network devices to deliver the first media asset to the user device;

identifying, based on the location associated with the user device and the profile for the subscriber, advertisements associated with the first media asset;

inserting the identified advertisements into the first media asset;

providing a uniform resource locator (URL) and an authorization token to the user device, wherein the URL is associated with the identified network device;

receiving, from the user device, the authorization token at the identified network device;

determining, based on the authorization token, whether to provide the first media asset to the user device;

providing, via the identified network device, the first media asset to the user device in response to determining to provide the first media asset;

identifying, prior to providing the first media asset and from the profile for the subscriber associated with the user device, a bookmark associated with the first media asset;

providing the bookmark to the user device with the URL and the authorization token; and receiving, from the user device, the bookmark at the identified network device, and wherein providing the first media asset comprises:

providing the first media asset to the user device beginning at a point corresponding to the bookmark.

17. The method of claim 16, wherein the identifying a location associated with the user device comprises:

identifying a geographic region code (GRC), a Federal Information Processing Standard (FIPS) state or region code, a content distribution network coverage area, or an advertisement zone, wherein the method further comprises:

identifying advertisements to insert in the first media asset based on at least one of the GRC, the FIPS state or region code, the content distribution network coverage area, or the advertisement zone.

* * * * *